Figure 7:
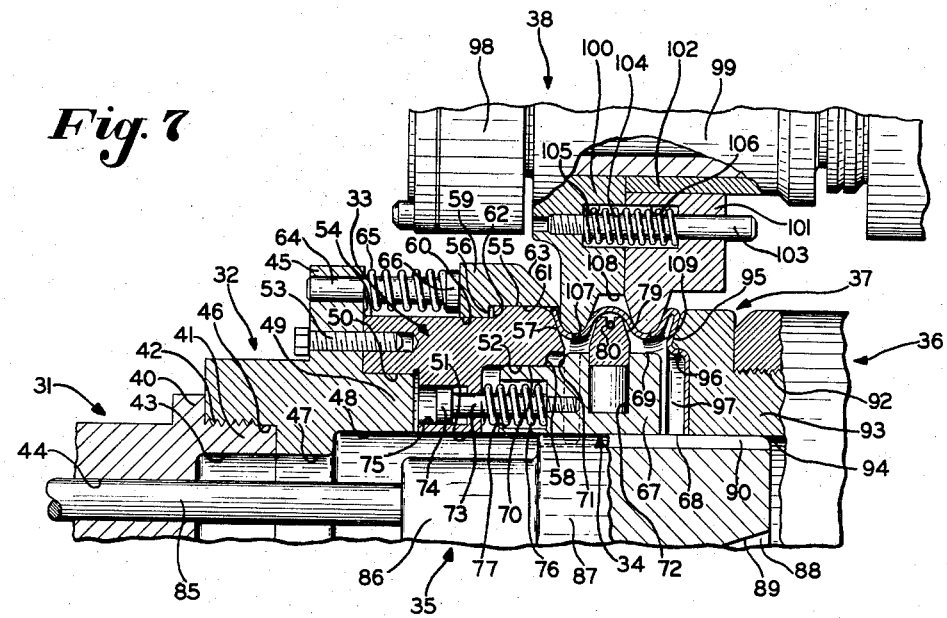

Jan. 20, 1959   R. J. KILLIAN ET AL   2,869,223
METHOD OF FORMING MULTI-GROOVE PULLEYS
Filed March 30, 1955   2 Sheets-Sheet 1
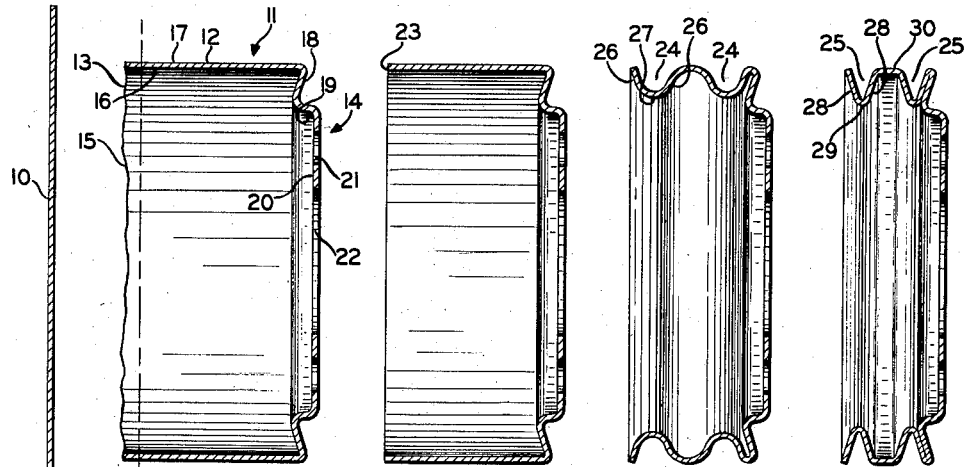
Fig. 2   Fig. 3   Fig. 4   Fig. 5
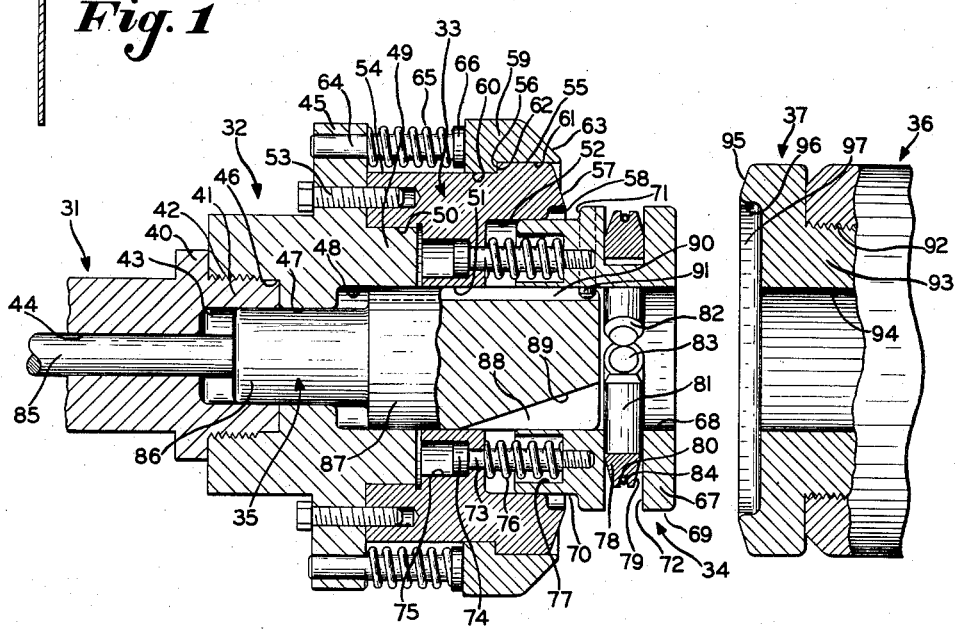
Fig. 1
Fig. 6
INVENTORS
ROBERT J. KILLIAN and
GLENN M. BROWN
BY
Frease & Bishop
ATTORNEYS Jan. 20, 1959   R. J. KILLIAN ET AL   2,869,223
METHOD OF FORMING MULTI-GROOVE PULLEYS
Filed March 30, 1955   2 Sheets-Sheet 2

INVENTORS
ROBERT J. KILLIAN and
GLENN M. BROWN

BY
Frease & Bishop
ATTORNEYS

United States Patent Office 2,869,223
Patented Jan. 20, 1959

2,869,223

METHOD OF FORMING MULTI-GROOVE PULLEYS

Robert J. Killian and Glenn M. Brown, Canton, Ohio, assignors to Automatic Steel Products, Inc., Wilmington, Del., a corporation of Delaware Application March 30, 1955, Serial No. 497,880

5 Claims. (Cl. 29—159)

Our invention relates to method of forming multi-groove pulleys and more specifically to a method of forming one-piece multi-groove pulleys by roller forming a series of parallel grooves in one or more contiguous flanges of a cup-shaped blank. The present invention constitutes improvements upon the methods set forth in the Nelson Patent No. 1,689,061, the Harrison Patents Nos. 1,828,464 and 2,062,415 and the Wickwire, et al., Patent No. 2,685,856. Further, the improved method may be carried out utilizing apparatus illustrated and described in our copending application, filed February 17, 1955, Serial No. 488,870.

Various forms and configurations of V-groove pulleys have been and are presently being used with V-cross-section belts as a power transmission means between prime movers and various devices to be driven thereby, such as between an automobile crankshaft and the various subassemblies, such as generators, water pumps and cooling fans. In most of these applications using V-groove pulleys and V-belts, it is very essential that the grooves of the pulley are concentric with the axis about which the pulley rotates and also that these grooves are of uniform width at any particular diameter around the circumference of the pulley.

If these V-grooves of the pulleys are out of concentricity and have variations in groove widths around the circumference thereof, it may cause an uneven drive between the pulleys, create considerable noise, or may cause a decrease in the amount of power that may be transmitted thereby. This has become a very important factor particularly in the modern day automobile, due to the higher speeds of the engines and the greater amounts of power to be transmitted by such V-groove and V-belt assemblies.

Usually in automobiles, it has been necessary to provide a pulley or pulleys on the crankshaft of the automobile with a series of V-grooves so that each or groups of these grooves, in combination with V-belts, may be used to drive various subassemblies of the automobile. Thus, it is desirable to provide a single piece pulley having a series of parallel V-grooves formed therein for use on the crankshaft of an automobile and on certain of the subassemblies where a number of parallel V-grooves are required, rather than use a group of pulleys, each having a single groove formed therein, to provide the necessary number of parallel grooves required. The provision of the single piece multi-groove pulley results in a saving in the amount of material required to provide the series of parallel grooves and also results in less weight than by use of a series of single groove pulleys.

Certain prior constructions of one-piece multi-groove pulleys have been formed by numerous press operations and by the use of various complicated dies. In such instances, the blank pulley cup is usually first formed with an axially extending flange thereon, which flange is of sufficient length to provide the number of parallel grooves required. This blank cup is then subjected to a series of press operations using various complicated dies. Such dies frequently have segments which reciprocate perpendicularly to the axially extending flange, which segments when extended, form a circular ring working against a similar internal ring to form each of the V-grooves. Usually only a single groove can be formed in one operation, thereby requiring numerous operations to form the total number of grooves required.

The dies necessary for forming these prior constructions of one-piece multi-groove pulleys are very expensive in original cost and require constant maintenance resulting in a high cost per piece of the finished product. Further, with such dies, even though very precisely constructed, it is difficult to manufacture pulleys having the required groove width uniformity and the required concentricity. Also, the metal walls forming the grooves are usually comparatively soft and frequently rough causing fast wear of the pulley during use, as well as high belt wear.

It is therefore a general object of the present invention to provide a method of forming multi-groove pulleys which overcomes the indicated difficulties of the prior art and methods.

It is a primary object of the present invention to provide a method of forming multi-groove pulleys by which it is possible to form one-piece multi-groove pulleys with extremely close concentricity and uniform groove widths.

It is a further object of the present invention to provide a method of forming multi-groove pulleys by which it is possible to form a one-piece multi-groove pulley having groove surfaces which are smooth and work-hardened.

It is still a further object of the present invention to provide a method of forming multi-groove pulleys with which all of the grooves of the pulley have each of the various operations performed thereon at the same time.

It is another object of the present invention to provide a method of forming multi-groove pulleys in which portions of the undersides of the groove walls are supported during roller forming of the grooves, thereby providing uniform smooth and work-hardened groove surfaces.

It is still another object of the present invention to provide a method of forming multi-groove pulleys in which the roller means for forming the grooves is permitted to move axially and the internal supporting means supporting portions of the undersides of the groove walls is permitted to move axially, thereby providing exactly located uniform width perfectly concentric grooves.

Finally, it is an object of the present invention to provide a method of forming multi-groove pulleys by which all of the above objects may be accomplished in an efficient and economical manner resulting with a cost per piece much less than in using prior methods of forming multi-groove pulleys.

These and other objects and advantages may be obtained, the stated results achieved, and the described difficulties overcome by the methods, steps, operations and procedures which comprise the present invention, the nature of which is set forth in the following general statement, a preferred embodiment of which—illustrative of the best mode in which applicants have contemplated applying the principles—is set forth in the following description and which is particularly and distinctly pointed out and set forth in the appended claims forming a part hereof.

In general terms, the method of forming multi-groove pulleys comprising the present invention, may be stated as including the steps of blanking a circular blank preferably flat hot rolled steel of a thickness in the order of 14 to 18 ga., forming the circular blank into a cup-shaped blank having a contiguous flange wall with inner and outer sides and an open end, preferably trimming said flange wall to a predetermined uniform axial length, rotating said cup-shaped blank, substantially simultaneously applying radial pressure to a series of preferably axially spaced parallel portions at the outer side of the flange wall with preferably a first roll means to form a series of parallel preferably axially spaced rough grooves at said portions each having two inwardly extending side walls and each having bottom portions, preferably substantially simultaneously applying radial pressure to said outer side portions with preferably a second roll means to form said rough grooves into finished grooves, preferably applying axial pressure to the flange wall preferably during the period while said radial pressures are applied, preferably radially confining said open end of the flange wall during the period while said radial and axial pressures are applied, supporting portions of the inner side of the flange wall at least at certain portions of the area between the bottom portions of adjacent grooves and preferably at each of the side walls of each of the grooves during at least a portion of the period during which said radial pressures are applied.

Figure 8:
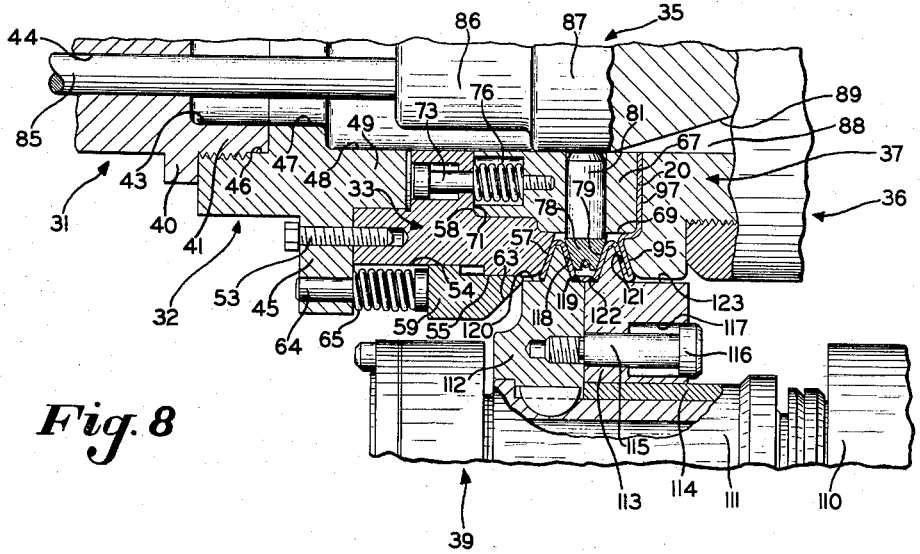

By way of example, an embodiment of a form of apparatus for performing the method of forming multigroove pulleys of the present invention is illustrated in the accompanying drawings forming a part hereof, wherein like numerals indicate similar parts throughout the several views, and in which:

Fig. 1 is a diagrammatic sectional view of a flat circular sheet metal blank from which a pulley may be fabricated in accordance with the method of the present invention;

Fig. 2, a diagrammatic vertical axial sectional view of a cup-shaped pulley blank drawn from the flat sheet metal blank of Fig. 1;

Fig. 3, a similar view of the cup-shaped blank of Fig. 2 after the cup has been trimmed to provide a predetermined uniform length of annular flange;

Fig. 4, a view similar to Fig. 3 illustrating a series of parallel rough stage V-grooves roller spun in the flange of the cup-shaped blank of Fig. 3;

Fig. 5, a view similar to Fig. 3 illustrating a series of parallel finished V-grooves roller spun in the flange of the cup-shaped blank of Fig. 3;

Fig. 6, a fragmentary vertical axial sectional view, part in elevation, of the headstock and tailstock die assemblies, and the mandrel assembly for performing the method of the present invention with the die assemblies separated;

Fig. 7, a similar view to Fig. 5 with a portion of the headstock and tailstock die assemblies and the mandrel assembly broken away, and with a fragmentary vertical axial sectional view of the roughing roll assembly, part in elevation, engaged with and forming the rough grooves in the pulley cup; and Fig. 8, a similar view to Fig. 7 with a fragmentary vertical axial sectional view, part in elevation, of the finishing roll assembly engaged with and forming the finished grooves in the pulley cup.

The configurations of the parts ultimately forming the finished pulley after the various steps of the methods comprising the present invention are illustrated in Figs. 1 through 5. The pulleys are preferably formed from relatively flat hot rolled steel sheets or strips, preferably of the order of 14 to 18 ga. The thickness and composition of the material to be used in forming the pulleys is, however, dependent on the construction of pulley desired, and it should be understood that the present method is not confined to the particular material or thickness of material stated.

In the first operation, a circular blank as illustrated at 10 in Fig. 1, is pierced or blanked from the flat sheet or strip, which blank is then formed into the cup-shaped blank, generally indicated at 11 in Fig. 2. The circular blank and the operation of drawing the circular blank to ultimately form the cup-shaped blank 11 may be done in a single or numerous die operations depending on the particular material, thickness of material and the various dimensions of the cup-shaped blank 11. In any event, the cup-shaped blank 11 is formed by usual die operations.

The cup-shaped blank 11 is generally cylindrical in configuration and is provided with an annular axially extending flange 12, an open end 13 and a closed end 14. The open end 13 will usually be provided with the uneven edge portion 15, as a result of the various drawing operations.

The flange 12 is provided with an inner side 16 and an outer side 17, and is integrally connected to the closed end 14 of the cup-shaped blank. The closed end 14 extends radially inwardly and is formed with an annular generally radially extending double flange groove portion 18, which portion is angled towards the open end 13, from the flange 12 inwardly.

End 14 is then formed with a generally axially extending annular shoulder portion 19 connected to the inner end of the portion 18 and extending axially away from the open end 13. The generally radially extending annular fastening portion 20 is integrally connected to the shoulder portion 19 at the end of shoulder portion 19 opposite from its connection to portion 18, with fastening portion 20 extending radially inwardly and being provided with the circumferentially spaced fastening bolt holes 21 and the center hole 22.

It should be understood that the particular configuration of the cup-shaped blank 11, shown in Fig. 2, is dependent on the configuration of the final pulley desired. In other words, the particular configuration of the closed end 14, the provision location and number of bolt holes 21, and the size of the center hole 22, are all dependent on the particular final pulley to be formed. Further, the configuration of the flange 12, that is, whether this flange extends axially or is provided with radially spaced stepped portions which extend axially, is also dependent on the configuration of the final pulley to be formed.

Preferably the next step is to trim the uneven edge portion 15 so that the flange 12 is of a predetermined uniform axial length completely around the circumference of the cup-shaped blank 11, providing the uniform edge portion, indicated at 23, in Fig. 3. Other than the edge portion 23, the configuration of the cup-shaped blank 11 is the same after the trimming operation, as before, as shown in Fig. 3.

The configuration of the closed end 14 remains the same during the succeeding operations of forming a series of parallel grooves in the axially extending flange 12. These grooves are preferably formed in two stages, that is rough grooves 24, as shown in Fig. 4 are first formed, after which the rough grooves 24 are formed into the finished grooves 25, as shown in Fig. 5.

Referring to Fig. 4, the flange 12 is formed radially inwardly providing preferably generally arcuate cross-section annular walls forming the grooves 24, with side wall portions 26 and bottom wall portions 27. During this rough groove-forming stage, the length of the flange 12 is reduced so that there is little, if any thinning of this flange in forming the grooves 24.

Thereafter, the rough grooves 24 are formed into the finished grooves 25, as shown in Fig. 5. In the particular embodiment shown, the finished grooves 25 are preferably generally V-shaped in cross-section and are provided with the converging side walls 28 connected at a bottom portion 29. Also in the particular embodiment, the adjacent grooves 25 are connected by an annular axially extending portion 30, and the side wall 28 of the groove 25 nearest the groove portion 18 of the closed end 14 abuts this portion 18, as shown.

Preferred embodiments of an apparatus for roller forming the series of parallel grooves in the cup-shaped blank, shown in Fig. 3, are shown and described in detail in our copending application, filed February 17, 1955, Serial No. 488,870. A part of the apparatus shown and described in detail in said copending application is illustrated in Figs. 6, 7 and 8 of the present application and is hereinafter described.

Referring to Figs. 6, 7 and 8, a headstock spindle is generally indicated at 31, a headstock adapter at 32, a headstock die at 33, a mandrel assembly at 34, a mandrel segment support assembly at 35, a tailstock adapter at 36 and a tailstock die at 37. Also, a roughing roll assembly is generally indicated at 38 in Fig. 7 and a finishing roll assembly at 39 in Fig. 8.

Headstock spindle 31 is generally cylindrical in configuration and is journalled in a usual spinning machine (not shown). Spindle 31 is preferably driven by a usual driving means (not shown) and may be connected to said driving means through a clutch and brake assembly for a purpose to be hereinafter described.

Spindle 31 is mounted for rotation preferably in a horizontal position on the spinning machine but is preferably not movable axially in reference to the machine. A radially outwardly extending flange portion 40 is formed on the outer circumference of spindle 31 spaced from the end thereof, and a tool mounting portion 41 extends from flange 40 to the end of spindle 31.

Tool mounting portion 41 is provided with threads 42 at the outer circumference thereof, and a centrally located axially extending opening 43 extending from the end of spindle 31 the length of portion 41. A smaller diameter opening 44 extends axially from opening 43 centrally of spindle 31 and preferably the remainder of the length of spindle 31. Openings 43 and 44 are for a purpose to be hereinafter described.

Headstock adapter 32 is also generally cylindrical in configuration and is provided with a radially outwardly extending flange 45, a spindle mounting opening 46, a small diameter pilot opening 47 and a large diameter pilot opening 48. Adapter 32 is mounted on the spindle 31 with the tool mounting portion 41 of spindle 31 threadably received in the spindle mounting opening 46 of adapter 32 and with the end of adapter 32 abutting the flange 40 of spindle 31. Pilot opening 47 of adapter 32 is of the same diameter as the opening 43 in spindle 31, so that openings 43 and 47 are in axial alignment when the spindle 31 and the adapter 32 are so mounted.

Flange 45 is formed intermediate the length of adapter 32 and the pilot portion 49 is formed extending from flange 45 to the end of adapter 32 opposite the end thereof connected to spindle 31. Headstock die 33 is also generally cylindrical in configuration and is provided with an adapter connecting opening 50, a support assembly pilot opening 51 and a mandrel assembly pilot opening 52.

Die 33 is mounted with the pilot portion 49 of adapter 32 telescopically received within the opening 50 of die 33 and with the end of die 33 abutting the flange 45 of adapter 32. Support assembly pilot opening 51 of die 33 is of the same diameter as the large diameter pilot opening 48 of adapter 32, so that when adapter 32 and die 33 are so assembled, pilot openings 48 and 51 are in axial and circumferential alignment. Circumferentially spaced axially extending bolts 53 are received through the flange 45 of adapter 32 and threadably received in the die 33, retaining the adapter and die in assembled position.

Die 33 is formed at the outer circumference thereof with an axially extending small diameter circumferential surface 54 and a large diameter circumferential surface 55, with a shoulder 56 being formed therebetween. Surface 54 is of a diameter smaller than the outer diameter of flange 45 of adapter 32, with the large diameter surface 55 terminating at the end of die 33 away from adapter 32, in an annular radially inwardly extending angled groove-forming surface 57. Groove-forming surface 57 terminates inwardly in a shoulder portion 58 formed at the end of the mandrel assembly pilot opening 52, as shown.

Ring 59 is telescopically received over the die 33, with ring 59 being provided with a small diameter inner circumferential surface 60 abutting and slidable along surface 54 of die 33, a large diameter inner circumferential surface 61 abutting and slidable along large diameter surface 55 of die 33, and a shoulder 62 in axial alignment with shoulder 56 of die 33. Ring 59 is provided at the outer circumference thereof with a downwardly tapered roll engaging surface 63 at the end of ring 59 away from flange 45 of adapter 32.

A series of circumferentially spaced pins 64 are slidably received through the flange 45 of adapter 33 and abut the ring 59. Helical springs 65 are received around the pins 64 between the flange 45 of adapter 32 and the ring 59, with these springs abutting head portions 66 of pins 64 at ring 59.

Thus, springs 65 normally urge pins 64 to slide in a direction axially away from flange 45 of adapter 32, thereby urging the ring 59 away from flange 45. This normally positions the shoulder 62 of ring 59 abutting the shoulder 56 of the die 33, and when ring 59 is in such a position, the end of the surface 61 of ring 59 away from shoulder 62 overhangs the groove-forming surface 57 of the die 33.

Mandrel assembly 34 includes a support member 67 having a central axially extending opening 68 with said opening being of the same diameter as the pilot opening 51 of die 33. The outer circumference of support member 67 is formed with a large diameter portion 69, a small diameter portion 70 and a radially extending shoulder portion 71, with an annular radially extending recess 72 formed intermediate the length of the large diameter portion 69.

Support member 67 is telescopically received in the mandrel assembly pilot opening 52 of the die 33, with the shoulder 71 of member 67 in axial alignment with the shoulder 53 of die 33. A series of circumferentially spaced pins 73 are slidably received through die 33 and threadably received in support member 67, with the head portions 74 of pins 73 slidable in pin openings 75 of die 33. Helical springs 76 surround pins 73 with springs 76 abutting die 33 and being partially received in the spring openings 77 of support member 67.

Thus, the springs 76 normally urge the support member 67 to slide in a direction away from die 33 within the opening 52 of die 33, until the head portions 74 of pins 73 engage the die 33, as shown in Fig. 6. When support member 67 is in such position, the shoulder 71 of support members 67 is axially spaced from the shoulder 53 of die 33.

A complete annular series of arcuate support segments 78 are slidably received in the recess 72 of the support member 67, with these segments being provided with angled side working surfaces 79 and an outwardly opening circumferential recess 80, as shown more in detail in our co-pending application, Serial No. 488,870. Radially extending pilot members 81 are connected to segments 78 and extend radially inwardly being provided at the inner ends thereof with annular tapered cam surfaces 82 and axially extending cam surfaces 83.

A preferably helical circumferential garter spring 84 is received in the recesses 80 of segments 78, normally urging the segments 78 and the pilot members 81 to move radially inwardly. When the mandrel segment support assembly 35 is in the position shown in Fig. 6, the segments 78 are urged radially inwardly until the tapered cam surfaces 82 of the various pilot members 81 are in abutting relation. When the mandrel segment support assembly 35 is in the position shown in Figs. 7 and 8, the segments 78 are in the positions shown in Figs. 7 and 8, and the axial cam surfaces of the pilot members 81 abut a portion of mandrel segment support assembly 35, as shown.

The mandrel segment support assembly 35 includes an actuating shaft 85, a small diameter portion 86 and a large diameter portion 87. Shaft 85 is received axially slidable in the opening 44 of spindle 31, with the end thereof toward the adapter 32 and die 33 being connected to the small diameter portion 86 and with the small diameter portion 86 being connected to the large diameter portion 87. Small diameter portion 86 is of a diameter slightly smaller than the opening 43 of spindle 31 and opening 47 of adapter 32, and the large diameter portion 87 is of a diameter slightly smaller than the large diameter opening 48 in adapter 32, the opening 51 in the die 33 and the opening 68 in the mandrel support member 67.

Mandrel segment support assembly 35 is provided with actuating means (not shown) for selectively moving the shaft 85 and the portions 86 and 87 axially of the spindle 31, adapter 32, die 33 and mandrel assembly 34. Thus, the segment support assembly 35 may be selectively moved from the position shown in Fig. 6 to the position shown in Figs. 7 and 8.

The large diameter portion 87 is provided with a series of circumferentially spaced radially extending slots 88, which slots extend from the end of portion 87 opposite portion 86, toward portion 86, with the bottoms 89 of slots 88 tapering outwardly toward small diameter portion 86. Slots 88 have a width slightly greater than the outer diameter of the pilot members 81 of the segments 78 and are in axial alignment with pilot members 81.

Thus, when the mandrel segment support assembly 35 is moved axially toward pilot members 81 from the position shown in Fig. 6, the tapered cam surfaces 82 of members 81 will be engaged by the bottom surfaces 89 of slots 88 and large diameter portion 87 will thereby force the pilot members 81 and segments 78 radially outwardly. This outward movement continues until the cam surfaces 83 of pilot members 81 abut the outer circumferential surface of large diameter portion 87 and segments 78 form substantially a complete expanded circle around support assembly 35, as shown more in detail in our co-pending application, Serial No. 488,870.

Large diameter portion 87 is also provided at the outer circumference thereof with an axially extending slot 90, which slot is engaged by the end of a radially extending pin 91 mounted in the support member 67 of the mandrel assembly 34. Thus, the large diameter portion 87 of segment support assembly 35 may slide axially of the support member 67 of mandrel assembly 34, with pin 91 sliding in slot 90, but pin 91 will prevent portion 87 from rotating in reference to support member 67 of mandrel assembly 34. Due to this construction, the pilot members 81 will always be axially aligned with the slots 88, whether received in these slots or not.

The tailstock adapter 36 is rotatably mounted on a tailstock spindle (not shown) in axial alignment with the headstock spindle 31, adapter 32 and die 33. The tailstock spindle is preferably journalled in a slide which is axially movable in reference to the remainder of the spinning machine and is therefore axially movable in reference to the headstock spindle 31, being urged in said axial movement by a power means (not shown).

Thus, in the preferred embodiment of the spinning apparatus, the headstock spindle 31 is mounted for rotation in reference to the spinning machine but is not movable axially, while the tailstock spindle is mounted for both axial and rotational movement. Further, it is preferred that the headstock spindle 31 is rotatably driven while the tailstock spindle is rotated merely through its connection with the tailstock adapter 36, tailstock die 37 and the headstock adapter 33, through a cup-shaped blank having the series of parallel grooves formed therein. It should be understood, however, that either one of the headstock or tailstock spindles, or both, may be driven, or either may be movable axially by power means, without altering the principles of the present invention.

Tailstock adapter 36 is generally cylindrical in configuration and is provided with a centrally located axially extending opening 92, within which opening is received the mounting portion 93 of the tailstock die 37. Tailstock die 37 is also generally cylindrical in configuration and is provided with a centrally located axially extending opening 94 of the same diameter as the opening 68 in the support member 67 of the mandrel assembly 34.

Tailstock die 37 terminates, at the end thereof toward the headstock die 33, in a generally radially extending annular groove-forming surface 95. Surface 95 extends radially inwardly and terminates in a shoulder portion 96, which shoulder portion extends generally axially providing a large diameter opening 97.

The roughing roll assembly, generally indicated at 38 and shown in Fig. 7, includes a roll holder 98, a spindle means 99, an axially stationary roughing roll 100 and an axially movable roughing roll 101. Roll holder 98 is preferably mounted to one side of headstock and tailstock dies 33 and 37, and is preferably horizontally movable toward and away from these dies.

The spindle means 99 is journalled on the roll holder 98, with the roughing rolls 100 and 101 being fixed against rotation in reference to the spindle means 99, so that roughing rolls 100 and 101 are rotatable with spindle means 99. Roughing roll 100 is mounted so that it is not movable axially of spindle means 99, however, roughing roll 101 is preferably mounted on a sleeve bearing means 102, so that roll 101 is axially movable toward and away from roll 100.

A series of circumferentially spaced spring pins 103 are slidably received through the axially movable roll 101 and are threadably received in roll 100. Preferably helical springs 104 are received surrounding the spring pins 103, with one end of the springs 104 being received in the spring hole 105 abutting roll 100, and the other end of the springs being received in the spring hole 106 abutting roll 101.

Also, as illustrated in Fig. 8, in the finishing roll assembly 39, the roughing roll assembly 38 is also provided with a series of circumferentially spaced stop pins slidably received through the roll 101 and threadably received in the roll 100. These stop pins limit the axial movement of roll 101 axially away from roll 100 and will be described in detail in reference to the finishing roll assembly 39.

Thus, rolls 100 and 101 are mounted for rotation in unison in reference to roll holder 98. Further, roll 101 is normally urged axially away from the roll 100, which axial movement away from roll 100, is limited by the stop pins. The construction described therefore permits the roll 101 to float axially in reference to the roll 100.

Roll 100 is formed at the outer circumference thereof with an arcuate cross-section annular groove-forming surface 107 and an annular axially extending shoulder portion 108. Shoulder 108 extends from the groove-forming surface 107 toward the axially movable roll 101 and is spaced radially inwardly from the outer circumference of roll 100.

Roll 101 is formed with a similar groove-forming surface 109, which surface is preferably of the same outer diameter as the surface 107 on roll 100. Thus, when rolls 100 and 101 are in abutting position, with the springs 104 compressed therebetween, the shoulder 108 forms a recessed axially extending surface between the groove-forming surface 107 of roll 100 and the groove-forming surface 109 of roll 101.

The finishing roll assembly 39, as shown in Fig. 8, is similar in construction to the roughing roll assembly 38 and is provided with a similar roll holder 110, spindle means 111, axially stationary finishing roll 112, axially movable finishing roll 113, with roll 113 being mounted on a similar sleeve bearing means 114. Also, the finishing roll assembly 39 is provided with similar spring pins and springs normally urging the roll 113 away from the roll 112, and the stop pins 115 limiting the movement of roll 113 axially away from roll 112.

As shown in Fig. 8, stop pins 115 are slidably received through roll 113 and threadably received in roll 112. Further, pins 115 are provided with enlarged head portions 116 which are slidable within enlarged openings 117 formed in roll 113. Thus, roll 113 may move axially away from roll 112, until the head portions 116 of pins 115 abut the bottom of the openings 117 in roll 113.

The principal difference between the roughing roll assembly 38 and the finishing roll assembly 39 is the shape of the various groove-forming surfaces on these rolls. Further, rolls 112 and 113 are provided with additional shoulders outwardly of the groove-forming surfaces not provided in the roughing roll assembly 38.

Roll 112 is formed at the outer circumference thereof with a generally V-shaped cross-section annular groove-forming surface 118, an axially extending annular shoulder 119 extending toward roll 113 and an axially extending annular shoulder 120 extending away from roll 113. Roll 113 is formed with a similar groove-forming surface 121 and similar shoulders 122 and 123, as shown in Fig. 8, with the outer diameter of the groove-forming surface 121 preferably being the same as the outer diameter of the groove-forming surface 118.

Thus, the finishing rolls 112 and 113 are also rotatable in unison, with roll 113 being axially movable toward and away from roll 112, and with such axial movement being limited by the stop pins 115. Further, the shoulders 118 and 122 of rolls 112 and 113 respectively, form a continuous axially extending recessed surface between the groove-forming surface 118 and 121 when rolls 112 and 113 are in abutting relation, but the distance between these groove-forming surfaces is less than in the roughing roll assembly 38.

Finishing roll assembly 39 is preferably mounted at the side of the headstock and tailstock dies 33 and 37 opposite from the roughing roll assembly 38. Assembly 39 is also generally horizontally movable toward and away from dies 33 and 37 similar to assembly 38.

At the beginning of the operation of forming the cup-shaped blank 11, shown in Fig. 3, into the finished pulley, shown in Fig. 5, the headstock and tailstock dies 33 and 37 are in the separated position, as shown in Fig. 6. As shown, the springs 65 urge the ring 59 toward the tailstock die 37, so that the shoulder 56 of headstock die 33 abuts the shoulder 62 of ring 59, and so that the surface 61 of ring 59 overhangs the groove-forming surface 57 of headstock die 33.

Also in this position, the springs 76 urge the support member 67 of the mandrel assembly 34 toward the tailstock die 37, so that the shoulder 71 of support member 67 is axially spaced from the shoulder 58 of headstock die 33. Further, the mandrel segment support assembly 35 is in its retracted position, with the small diameter portion 86 received in the openings 43 and 47 of the spindle 31 and adapter 32, and with the large diameter portion 87 spaced axially from the pilot members 81 of the segments 78 and received in the openings 48, 51 and 68 of the adapter 32, die 33 and mandrel support member 67. Finally, the garter spring 84 is retaining the segments 78 in their innermost radial position, with the various tapered cam surfaces 82 of pilot members 81 in abutting relation.

A cup-shaped blank 11, as shown in Fig. 3, preferably having the predetermined axial flange length as shown, is placed with the open end 13 thereof received against the groove-forming surface 57 of the headstock die 33 and beneath the surface 61 of the ring 59. Power means is then applied to move the tailstock spindle 37 against the closed end 14 of cup 11, with the groove-forming surface 95 of die 37 received abutting the double flange groove portion 18 of cup 11. Also, the shoulder portion 96 of die 37 abuts the shoulder portion 19 of cup 11 and the fastening portion 20 of cup 11 is received within the large diameter opening 97 of die 37.

Power means is then actuated to move the shaft 85, small diameter portion 86 and large diameter portion 87 of the mandrel segment support assembly 35 in a direction toward the tailstock die 37, so that the pilot members 81 of the mandrel assembly 34 are received in the slots 88 of the large diameter portion 87. As the mandrel segment support assembly 35 continues to move axially, the cam surfaces 83 of pilot members 81 ultimately rest on the outer circumferential surface of large diameter portion 87, so that the segments 78 are in their outermost radial position beneath the inner side 16 of the blank pulley cup 11.

Next the headstock spindle 31 is rotated, rotating the headstock die 33, the cup-shaped blank 11 and the tailstock die 37, and the roughing roll assembly 38 is moved toward the dies 33 and 37. At this point, the roughing rolls 100 and 101 are not rotating and the roll 101 is moved to its maximum position axially away from roll 100 by the springs 104. Also, the finishing rolls 112 and 113 are not rotating and the roll 113 is moved to its maximum position axially away from roll 112.

As the rolls 100 and 101 contact the outer side 17 of the cup-shaped blank 11, these rolls begin to rotate and also begin to form the rough grooves 24 in the cup-shaped blank 11. As the rough grooves 24 are formed, the inward movement of the flange wall 12 of the cup-shaped blank 11 and the continued pressure of the tailstock die 37 against this flange wall causes the length of the flange wall to decrease, thereby causing the tailstock die 37 to move closer to the headstock die 33.

This decreasing in length of the flange wall 12 of the cup-shaped blank 11 causes the roughing roll 101 to float or move axially toward the roughing roll 100. Further, as the rough grooves 24 are formed, the inner side 16 of the flange wall 12 abuts a portion of the side working surfaces 79 of the mandrel segments 78 and is supported thereon, with support member 67 of mandrel assembly 34 floating or moving axially in the direction toward the headstock die 33 as the roughing rolls 100 and 101 move closer together.

At the end of the rough groove-forming stage, the various parts are in the positions shown in Fig. 7, with ring 59 confining the open end 13 of the cup-shaped blank 11, and with the roughing rolls 100 and 101 in abutting relation. Further, as the tailstock die 37 moves toward the headstock die 33, the large diameter portion 87 of mandrel assembly 34 is received in the opening 94 of die 37, so that at the end of the rough groove-forming stage, the large diameter portion 87 is received a distance within the opening 94 of die 37, as shown in Fig. 7. The end of the support member 67 of mandrel assembly 34 is, however, still axially spaced from the tailstock die 37.

The roughing roll assembly 38 is then moved away from the dies 33 and 37 and the cup-shaped blank 11, with the finishing roll assembly 39 being started in its movement toward the dies 33 and 37. As the finishing roll assembly 39 approaches the dies 33 and 37, the groove-forming surface 118 of the finishing roll 112 engages the roll engagement surface 63 of the ring 59, thereby beginning to force the ring 59 axially toward the flange 45 of the adapter 32 and causing rolls 112 and 113 to begin to rotate.

As the finishing roll assembly 39 continues its movement toward dies 33 and 37, it moves past the end of ring 59 and engages the rough grooves 24 of the cup-shaped blank 11. Thus, the radial inward movement of the groove-forming surfaces 118 and 121 of rolls 112 and 113, and the continued pressure of the tailstock die 37, causes the length of the flange wall 12 of the cup-shaped blank 11 to again decrease, finally forming the finished grooves 25, as shown in Fig. 8.

As finished grooves 25 are formed, causing the length of the flange wall 12 of the cup-shaped blank 11 to decrease, the axially movable finishing roll 113 floats or moves axially toward the finishing roll 112. Further, the groove-forming surfaces 118 and 121 of rolls 112 and 113 form the finished grooves 25 against the side working surfaces 79 of the segments 78, and also against the groove-forming surfaces 57 and 95 of dies 33 and 37.

As the rolls 112 and 113 move axially together, the pressure of roll 113 against the segments 78 causes the support member 67 of the mandrel assembly 34 to continue its movement in the direction toward the headstock die 33, compressing the springs 76 and telescoping the small diameter portion 70 of support member 67 further within the pilot opening 52 of die 33. This axial movement of support member 67 continues until the shoulder portion 71 of support member 67 abuts the shoulder portion 58 of die 33, as shown in Fig. 8.

Also, as the finished grooves 25 are formed, the tailstock die 37 continues to move axially toward the headstock die 33 until the large diameter portion 69 of mandrel support member 67 telescopes within the large diameter opening 97 of die 37. Finally, as shown in Fig. 8, the large diameter portion 69 of mandrel support member 67 abuts the fastening portion 20 of the cup-shaped blank 11.

The radial inward movement of the finishing rolls 112 and 113 causes the ring 59 to continue to move axially toward the flange 45 of the adapter 32. At the final stages of the finished groove-forming operation, the open end 13 of the cup-shaped blank 11 is radially confined and worked by the shoulder 120 on the finishing roll 112, as shown in Fig. 8. Also, the finishing roll 112 and 113 are in abutting relation, so that the shoulders 119 and 122 on these rolls form a continuous axially extending surface, thereby forming, working and radially confining the connecting portion 30 on the cup-shaped blank 11 between the finished grooves 25. Finally, the shoulder 123 radially confines and works the double flange groove portion 18 of the pulley, as shown in Fig. 8.

After the finished grooves 25 have been formed and ironed to give them a predetermined smooth work-hardened groove wall surface, as a result of the groove-forming surfaces 118 and 121 of finishing rolls 112 and 113 ironing the finished grooves 25 against the side working surfaces 79 of segments 78 and the groove-forming surfaces 57 and 95 of the dies 33 and 37, the finishing roll assembly 39 is moved away from the dies 33 and 37. Power means is then actuated to move the shaft 85, small diameter portion 86 and large diameter portion 87 of the mandrel segment support assembly 35 in a direction away from the tailstock die 37, so that the cam surfaces 83 of pilot members 81 are no longer supported by the outer circumferential surface of the large diameter portion 87.

At this time, if the garter spring 84, circumferentially surrounding the segments 78, is of sufficient strength to overcome the centrifugal force of the segments 78 and pilot members 81, this spring will force segments 78 and pilot members 81 radially inwardly, until the tapered cam surfaces 82 of pilot members 81 are in abutting relation. If, however, the spring 84 is not of sufficient strength to overcome the centrifugal force of segments 78 and pilot members 81, these segments and pilot members will remain in their outer position, that is, the position shown in Fig. 8, until rotation of the dies 33 and 37 and the mandrel assembly 34 is stopped.

If the spring 84 is of this weaker design, the power to the driving means (not shown), driving the spindle 31, is cut off and the clutch and brake assembly on the driving means is actuated to stop rotation of the spindle 31. This stops rotation of the headstock and tailstock dies 33 and 37, the mandrel assembly 34 and the finished pulley formed from the cup-shaped blank 11. Segments 78 will then move radially inwardly, as before described, and the power means is actuated to move the tailstock die 37 away from the headstock die 33 so that the pulley may be removed, and so that the apparatus is in the position, as shown in Fig. 6, for reception of another cup-shaped blank 11.

If the spring 84, surrounding the segments 78 of the mandrel assembly 34, is of sufficient strength to overcome the centrifugal force of segments 78 and pilot members 81, a clutch and brake assembly need not be provided on the spinning machine drive means, since it is not necessary to stop rotation of dies 33, 37 and mandrel assembly 34 to have the segments 78 returned to their collapsed position. Thus, in such a case, once the mandrel segment support assembly 35 has been moved so that it no longer supports the segments 78 and pilot members 81, the segments 78 will be forced to their collapsed or maximum radial inward position by the spring 84, and the dies 33 and 37, although rotating, may be immediately separated and the finished pulley removed.

It should be understood that the particular cup-shaped blank formed, the finished pulley formed and the use of the dies and mandrel shown are merely by way of example, illustrating the principles of the methods of the present invention. For instance, the fastening portion 20 of the cup-shaped blank 11 might be of different configuration, thereby requiring the dies 33 and 37 and the mandrel assembly 34 to be of different configuration.

Further, the axially extending flange 12 of the cup-shaped blank 11 might be of stepped configuration, thereby requiring the dies 33 and 37 and the mandrel assembly 34 to be of different configuration. Also, more than two finished grooves 25 might be formed requiring that the mandrel assembly 34 be of numerous parts so that each of these grooves may be properly formed.

Still further, the finished grooves 25 may be axially adjacent each other or spaced a greater axial distance apart, requiring a different configuration of segments 78, or these grooves 25 may not be formed axially adjacent the headstock die 33 and the tailstock die 37, thereby eliminating the necessity of the groove-forming surfaces 57 and 95 on these dies. Furthermore, the shape of the finished grooves 25 may be different, requiring different groove-forming surfaces on either or both of the roughing roll assembly 38 and finishing roll assembly 39.

Additionally, depending on the material from which the cup-shaped blank 11 is formed and the type of finished groove 25 that is desired, these grooves might be formed by merely a finishing roll assembly such as assembly 39 without the use of a roughing roll assembly, such as assembly 38, and the axial pressure between the headstock die 33 and the tailstock die 37 might be eliminated. In the case where the pressure between the headstock and tailstock dies 33 and 37 was eliminated, it would only be necessary that these dies move axially closer together to follow the cup-shaped blank 11 as the axial length of flange 12 decreased.

Finally, if the flange 12 of the cup-shaped blank 11 is not trimmed to predetermined axial length before the groove-spinning operations, the ring 59 may be eliminated. In this case, this trimming operation of the open end 13 would be done after the finished grooves 25 have been formed.

Thus, a method of forming multi-groove pulleys is provided which overcomes the difficulties of prior methods hereinbefore stated; by which it is possible to form one-piece multi-groove pulleys with extremely close concentricity and uniform groove widths; by which it is possible to form a one-piece multi-groove pulley having groove surfaces which are smooth and work-hardened; with which all of the grooves of a pulley have each of the various operations performed thereon at the same time; in which portions of the undersides of the groove walls are supported during roller forming of the grooves, thereby providing uniform smooth and work-hardened groove surfaces; in which a portion of the roller means for forming the grooves is permitted to move axially and the internal supporting means supporting portions of the undersides of the groove walls is permitted to move axially, thereby providing exactly located uniform width perfectly concentric grooves; and by which all of these many advantageous features may be accomplished in an efficient and economical manner resulting in a cost per piece much less than prior methods of forming multi-groove pulleys.

In the foregoing description, certain terms have been used for brevity, clearness and understanding, but no unnecessary limitations are to be implied therefrom, because such terms are used for descriptive purposes herein and not for the purposes of limitation, and are intended to be broadly construed.

Moreover, the description of the improvements is by way of example and the scope of the present invention is not limited to the exact details illustrated and described.

Having now described the features, discoveries and principles of the invention, the operation and procedure of preferred method steps thereof, and the advantageous new and useful results obtained thereby; the new and useful methods, steps, operations, procedures, discoveries and principles, and equivalents thereof, obvious to those skilled in the art, are set forth in the appended claims.

We claim:

1. The method of roller forming a series of parallel axially spaced grooves in a contiguous hollow cylindrical flange wall of a cup-shaped pulley blank, said flange wall having circumferentially continuous inner and outer sides and a uniform axial length and an open end, and each of said grooves having two inwardly extending side walls and minimum diameter; including the steps of rotating the cup-shaped pulley blank, substantially simultaneously applying radial pressure to a series of axially spaced parallel portions of the outer side of the flange wall with a first roll means to form a series of parallel axially spaced rough pulley grooves at said portions, then substantially simultaneously applying radial pressure to said outer side portions with a second roll means to form said rough pulley grooves into finished pulley grooves, applying axial pressure to the flange wall during the periods while said radial pressures are applied, supporting portions of the inner side of the flange wall simultaneously substantially entirely around the inner circumference of the flange wall at each of the side walls of each of the grooves including portions radially outward of the groove minimum diameters during at least a portion of the period when said radial pressure is applied by said first roll means, maintaining said circumferential support after it has been established until the completion of the groove-forming operation including the period between the forming of the rough and finished grooves and the period of forming the finished grooves, confining said flange wall open end during the period when said radial and axial pressures are being applied by the first and second roll means, forming said flange wall open end during the latter portion of the forming of the finished grooves, radially confining and forming the outer side flange wall portions immediately adjacent the grooves which are not at said open end during the latter portion of the forming of the finished grooves, and moving at least a portion of said support radially inwardly free of said inner side of the flange wall after the grooves have been formed so that the pulley blank having said formed grooves can be removed from said support.

2. The method of roller forming a series of parallel grooves in a contiguous flange wall of a cup-shaped pulley blank, said flange wall having circumferentially continuous inner and outer sides and a predetermined axial length, and each of said grooves having bottom portions and minimum diameters; including the steps of rotating the cup-shaped pulley blank, substantially simultaneously applying radial pressure to a series of parallel portions at the outer side of the flange wall to form pulley grooves at said portions and to decrease the axial length of said wall, supporting the inner side of the flange wall simultaneously substantially entirely around the inner circumference of the flange wall at least at certain portions of the area between the bottom portions of adjacent grooves including portions radially outward of the groove minimum diameters during at least a portion of the period when the radial pressure is applied, maintaining said circumferential support after it has been established until the completion of the groove-forming operation, and moving at least a portion of said support radially inwardly free of said inner side of the flange wall after the grooves have been formed so that the pulley blank having said formed grooves can be removed from said support.

3. The method of roller forming a series of parallel grooves in a contiguous flange wall of a cup-shaped pulley blank, said flange wall having circumferentially continuous inner and outer sides, and each of said grooves having bottom portions and minimum diameters; including the steps of rotating the cup-shaped pulley blank, substantially simultaneously applying radial pressure to a series of parallel portions at the outer side of the flange wall to form pulley grooves at said portions, at the same time applying axial pressure to the flange wall, supporting the inner side of the flange wall simultaneously substantially entirely around the inner circumference of the flange wall at least at certain portions of the area between the bottom portions of adjacent grooves including portions radially outward of the groove minimum diameters during at least a portion of the period when the radial pressure is applied, maintaining said circumferential support after it has been established until the completion of the groove-forming operation, and moving at least a portion of said support radially inwardly free of said inner side of the flange wall after the grooves have been formed so that the pulley blank having said formed grooves can be removed from said support.

4. The method of roller forming a series of parallel grooves in a contiguous flange wall of a cup-shaped pulley blank, said flange wall having circumferentially continuous inner and outer sides and a uniform axial length and an open end, and each of said grooves having two inwardly extending side walls and a minimum diameter; including the steps of rotating the cup-shaped pulley blank, substantially simultaneously applying radial pressure to a series of parallel portions at the outer side of the flange wall to form pulley grooves at said portions, at the same time applying axial pressure to the flange wall, supporting portions of the inner side of the flange wall at each of the side walls of each of the grooves simultaneously substantially entirely around the inner circumference of the flange wall including portions radially outward of the groove minimum diameters during a portion of the period when the radial pressure is applied, maintaining said circumferential support after it has been established until the completion of the groove-forming operation, confining said flange wall open end during the period when said radial and axial pressures are being applied, and moving at least a portion of said support radially inwardly free of said inner side of the flange wall after the grooves have been formed so that the pulley blank having said formed grooves can be removed from said support.

5. The method of roller forming a series of parallel axially spaced grooves in a contiguous flange wall of a cup-shaped pulley blank, said flange wall having circumferentially continuous inner and outer sides, and each of said grooves having two inwardly extending side walls and a minimum diameter; including the steps of rotating the cup-shaped pulley blank, substantially simultaneously applying radial pressure to a series of axially spaced parallel portions at the outer side of the flange wall with the first roll means to form a series of parallel axially spaced rough pulley grooves, then substantially simultaneously applying radial pressure to said outer side portions with a second roll means to form said rough pulley grooves into finished pulley grooves, applying axial pressure to the flange wall during the periods, while said radial pressures are applied, supporting portions of the inner side of the flange wall simultaneously substantially entirely around the inner circumference of the flange wall at each of the side walls of each of the grooves including portions radially outward of the groove minimum diameters during at least a portion of the period when said radial pressure is applied by said first roll means, maintaining said circumferential support after it has been established until the completion of the groove-forming operation including the period between the forming of the rough and finished grooves and the period of forming the finished grooves, and moving at least a portion of said support radially inwardly free of said inner side of the flange wall after the grooves have been formed so that the pulley blank having said formed grooves can be removed from said support.

References Cited in the file of this patent
UNITED STATES PATENTS

| | | |
|---|---|---|
| 1,680,061 | Nelson | Aug. 7, 1928 |
| 1,856,151 | Bloss et al. | May 3, 1932 |
| 2,061,501 | Brown | Nov. 17, 1936 |
| 2,062,415 | Harrison | Dec. 1, 1936 |
| 2,685,856 | Wickwire et al. | Aug. 10, 1954 |